United States Patent [19]
Ghosh

[11] Patent Number: 5,233,280
[45] Date of Patent: Aug. 3, 1993

[54] VARIABLE SPEED MULTI-PHASE MOTOR POWERED VIA A CONVERTER

[75] Inventor: Shyamal-Krishna Ghosh, Bad Neustadt, Fed. Rep. of Germany

[73] Assignee: Siemens Aktiengesellschaft, Munich, Fed. Rep. of Germany

[21] Appl. No.: 913,258

[22] Filed: Jul. 14, 1992

[30] Foreign Application Priority Data

Jul. 22, 1991 [DE] Fed. Rep. of Germany ....... 4124275

[51] Int. Cl.[5] .............................................. H02P 7/00
[52] U.S. Cl. .................... 318/800; 318/439; 310/179
[58] Field of Search ............... 318/800, 762, 254, 138, 318/439, 371, 495, 496, 525, 773, 685, 246, 792–812; 310/192, 140, 179

[56] References Cited

U.S. PATENT DOCUMENTS

| | | | |
|---|---|---|---|
| 3,786,327 | 1/1974 | Dyer | 318/762 |
| 3,949,254 | 4/1976 | Woll et al. | 310/198 |
| 4,065,708 | 12/1977 | Ulland et al. | 318/685 |
| 4,307,311 | 12/1981 | Grozinger | 310/179 |
| 4,364,001 | 12/1982 | Heidt et al. | 318/371 |
| 4,500,824 | 2/1985 | Miller | 318/138 X |
| 4,675,591 | 6/1987 | Pleiss | 318/773 |
| 4,730,149 | 3/1988 | Zeitvogel | 318/246 |
| 4,740,734 | 4/1988 | Takeuchi et al. | 318/254 |
| 5,066,638 | 11/1991 | Lloyd et al. | 310/198 X |

FOREIGN PATENT DOCUMENTS

| | | |
|---|---|---|
| 2834523 | 2/1980 | Fed. Rep. of Germany . |
| 3616204 | 12/1986 | Fed. Rep. of Germany . |
| 8904874 | 7/1989 | Fed. Rep. of Germany . |

OTHER PUBLICATIONS

IEEE Transactions on Industry Applications, vol. 26, No. 1, Jan./Feb. 1990, John C. Salmon et al.: A Split--Wound Industion Motor Design to Improve the Reliability of PWM Inverter Drives.

Primary Examiner—Jonathan Wysocki
Attorney, Agent, or Firm—Kenyon & Kenyon

[57] ABSTRACT

The invention relates to a variable speed multi-phase motor powered via a converter, which reduces the control expenditure by dividing the stator winding into a number of partial coils corresponding to the phase number of the motor, arranged in equal grooves. A phase strand of each partial winding is connected to the one pole via a controllable semiconductor switching element, and the other phase strands are connected to the other pole of the direct current intermediate circuit of the converter in series to the one phase strand. Furthermore, a phase strand of each partial winding belonging to the other phase is connected to the corresponding pole of the direct current intermediate circuit via the controllable semiconductor switching element.

20 Claims, 2 Drawing Sheets

VARIABLE SPEED MULTI-PHASE MOTOR POWERED VIA A CONVERTER

BACKGROUND OF THE INVENTION

The present invention relates to a variable speed multi-phase motor powered via a converter.

Such a motor is known from DE-A-28 34 523. To control the direction or speed of rotation of this motor, a DC/AC converter consisting of thyristors arranged in a bridge circuit is provided. Thus, two thyristors are required per phase, with a diode switched in parallel with them in each case. Such an arrangement requires high expenditure of expensive high-quality technical components.

The present invention provides a unique control configuration that seeks to reduce the technical expenditure for controlling a motor of this general type.

SUMMARY OF THE INVENTION

The present invention achieves the above mentioned goal by providing a converter powered multi-phase motor system including a direct current intermediate circuit, a plurality of controllable semiconductor switching elements, and a plurality of partial windings. The direct current intermediate circuit has a positive pole and a negative pole. Each of the plurality of controllable semiconductor switching elements has a control input. Each of the plurality of partial windings includes a plurality of phase connections wherein one of the plurality of phase connections is connected to one of the positive and negative poles of the direct current intermediate circuit via one of the plurality of controllable semiconductor switching elements, and the other of the plurality of phase connections are connected to the other of the positive and negative poles of the direct current intermediate circuit. Further, the plurality of partial windings are arranged in equal grooves. By dividing the stator winding, galvanically separate partial windings are obtained. One of the phase strands of a partial winding can be switched to the one pole of the direct current intermediate circuit in each case via a controllable semiconductor switching element.

In an alternate embodiment, the stator winding of a variable speed multi-phase motor includes a direct current intermediate circuit, a plurality of semiconductor control elements (e.g., transistors) corresponding to the phase number, and a plurality of partial windings corresponding to the phase number. The direct current intermediate circuit includes a first pole and a second pole. Each of the plurality of partial windings includes a first terminal, a second terminal, a first parallel branch, and a second parallel branch. The first terminal is connected to the first pole of the direct current intermediate circuit. The second terminal is connected to the second pole of the direct current intermediate circuit via one of the plurality of semiconductor control elements. An uncontrolled rectifier element may also be disposed between the second terminal and the negative terminal of the direct current intermediate circuit to prevent disruptive error currents in a simple manner. The first parallel branch is disposed between the first terminal and the second terminal and includes a first phase strand and an uncontrolled rectifier diode. The first phase strand has a first winding direction. The uncontrolled rectifier diode is disposed between the first phase strand and the first terminal. The second parallel branch is disposed between the first terminal and the second terminal and includes a second and a third phase strand and an uncontrolled rectifier diode. The second and third phase strands have a winding direction opposite that of the first winding direction. An uncontrolled rectifier diode is disposed between the second and third phase strands and the first terminal. Again, only one controllable semiconductor switching element (e.g., a transistor) is required for the phase strands of each partial winding arranged in a parallel connection. Since a different phase strand is connected via the controllable semiconductor switching element (e.g., to the base of a transistor) for each partial winding, these phase strands of the partial windings can be turned on in the corresponding sequence to generate a rotary field. The number of controllable semiconductor switching elements and free-run diodes of the present invention is half of what was required in the prior art.

The direction and/or speed of rotation can be controlled by controllable semiconductor elements which are connected to a pulse width modulator. The control frequency of pulse width modulator can be changed with their control connections. This modulator switches on the semiconductor switching elements in the corresponding sequence.

Forming the partial windings by conductors would in parallel keeps the expense of producing the partial windings low.

The present invention is explained in greater detail below, based on an embodiment shown in the drawings.

DETAILED DESCRIPTION

Figure 1:
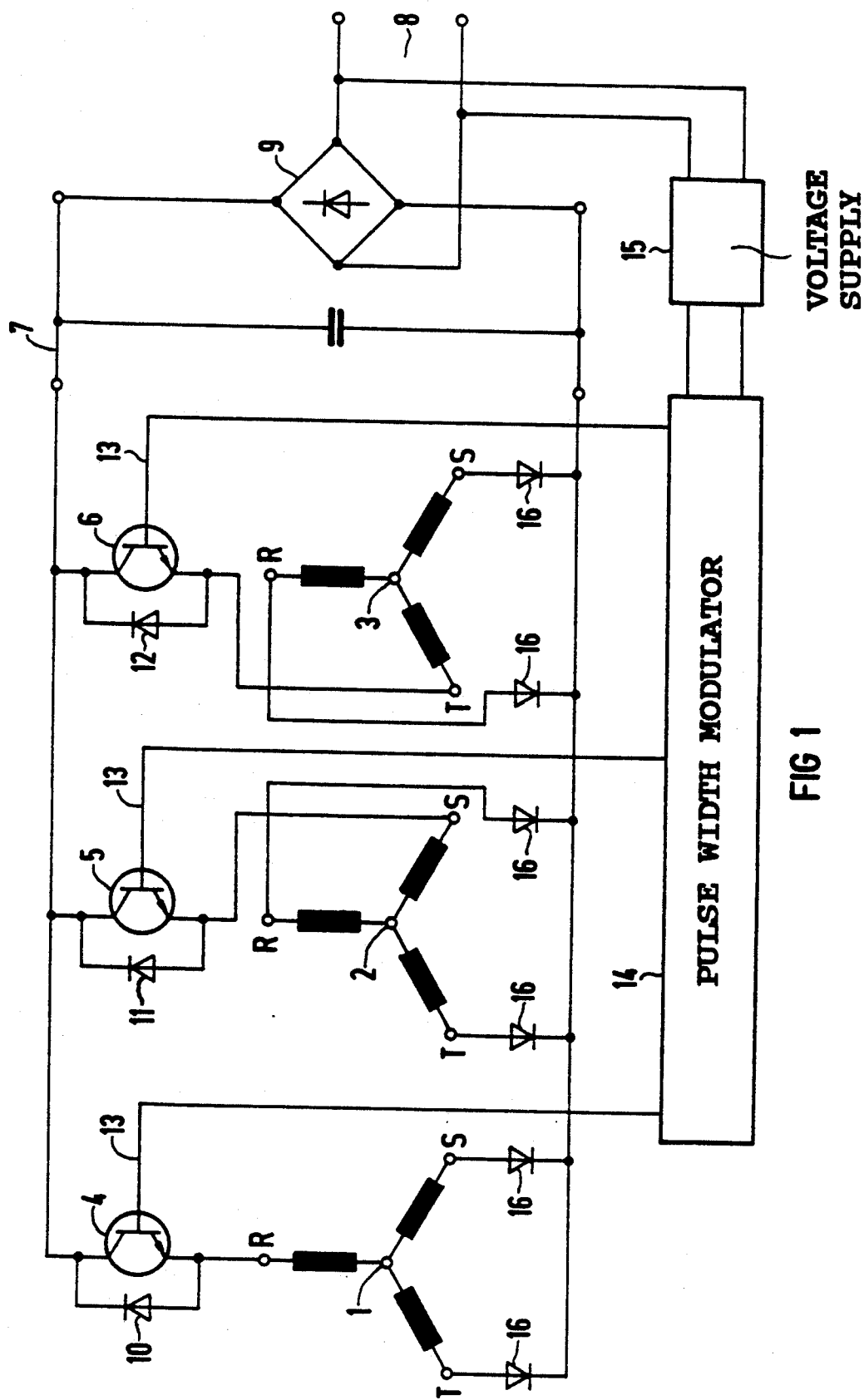
FIG. 1 depicts a circuit diagram of a stator winding of a multi-phase motor according to a first embodiment of the present invention.

The reference numerals 1, 2 and 3 refer to three three-phase partial windings, which together form the stator winding of a motor. In the embodiment depicted in FIG. 1, a phase connection R or S or T of each partial winding 1 or 2 or 3, respectively, can be switched to one pole (+) of a direct current intermediate circuit 7 via a controllable semiconductor switching element (e.g., a transistor) 4 or 5 or 6, respectively. The direct current intermediate circuit 7 is powered by a rectifier 9 connected to an alternating current network 8, and forms a converter together with the transistors 4 to 6 which act as DC/AC converters. Each of the transistors 4 to 6 also has a diode 10 or 11 or 12, respectively, switched opposite to it. Furthermore, each of the transistors 4 to 6 is connected to a pulse width modulator 14 with its control connection, its base, 13, and the modulator is powered from the alternating current network 8 via a voltage supply 15.

Figure 2:
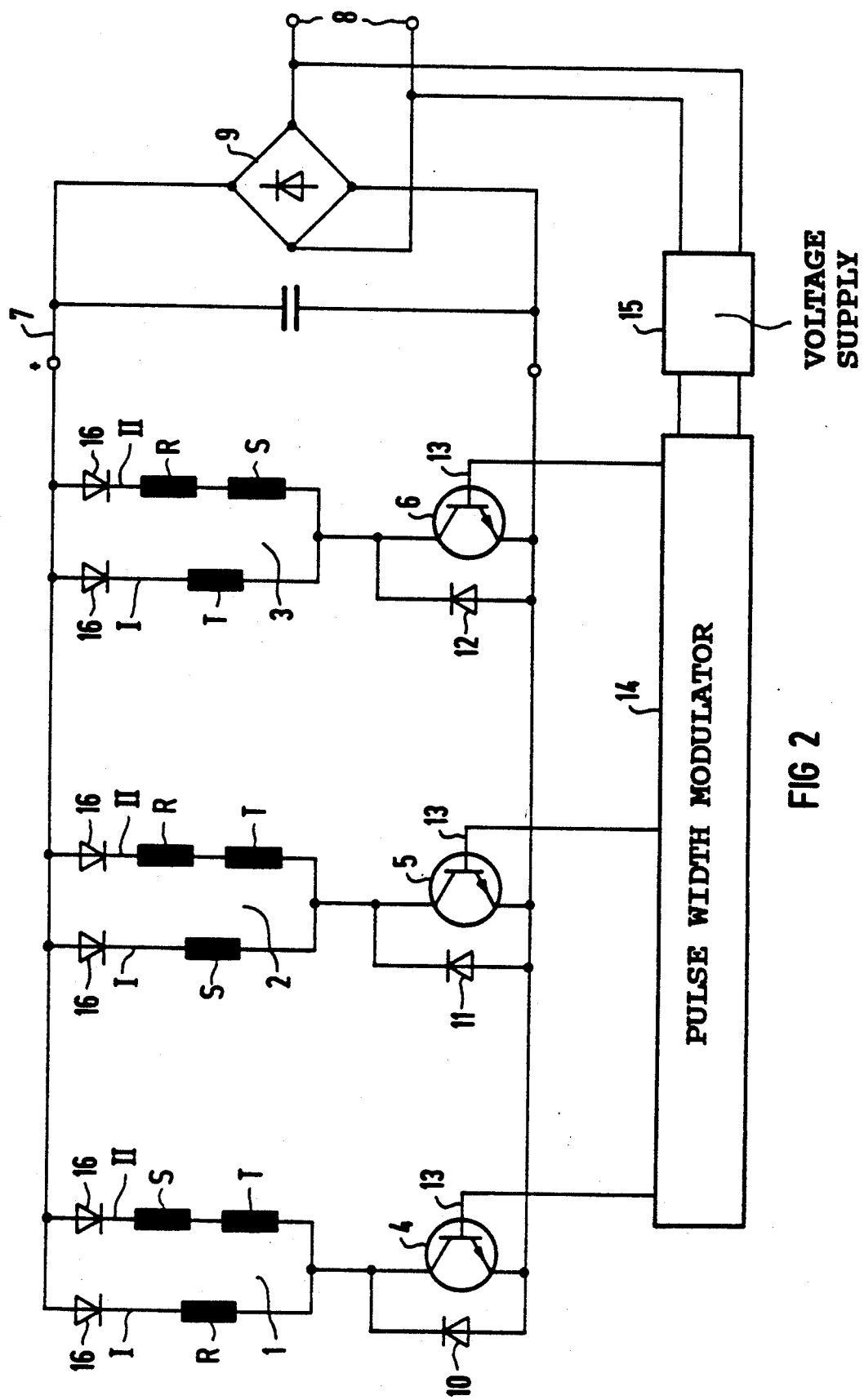
FIG. 2 depicts a circuit diagram of a stator winding of a multi-phase motor according to a second embodiment of the present invention.

As shown in FIG. 1, a phase connection of each partial winding 1 or 2 or 3 belonging to the other phase is connected to one (e.g., positive) pole of the direct current intermediate circuit 7. Thus, the phase connection R of the partial winding 1, the phase connection S of the partial winding 2, the phase connection T of the partial winding 3 is connected with the positive pole of the direct current intermediate circuit via the transistor 4 or 5 or 6, respectively. These phase connections thus represent the controlled phase connections of the partial windings 1 to 3. The two other phase connections of each partial winding 1 or 2 or 3 are connected to the other (e.g., negative) pole of the direct current intermediate circuit 7 via uncontrolled rectifier diodes 16, and thus form uncontrolled phase connections. The polarity of the circuit can also be reversed. Likewise, instead of the star circuit of the partial windings as shown, a triangular circuit can also be selected. FIG. 2 is a circuit diagram of a multi-phase motor according to an alternate embodiment of the present invention. Like the embodiment depicted in FIG. 1, this embodiment includes a rectifier 9 which converts alternating current from an AC network 8. Direct current is provided by the positive and negative terminals of DC intermediate circuit 7. A voltage supply 15 is connected to the AC network 8 and supplies voltage to a pulse width modulator 14. Partial windings 1, 2, and 3 each include a first parallel branch and a second parallel branch and a first and a second terminal. The first terminal of each of the partial windings 1, 2, and 3 is connected to the positive terminal of the DC intermediate circuit 7. The second terminal of each of the partial windings 1, 2, and 3 is connected to the negative terminal of the DC intermediate circuit 7 via transistors 4, 5, and 6, respectively. The second terminal of the partial windings 1, 2, and 3 may also be connected to the negative terminal of the direct current intermediate circuit by uncontrolled rectifier diodes 10, 11, and 12, respectively. The base of each transistor 4, 5, and 6 is connected to the pulse width modulator 14 so that the modulator controls the transistors. The first parallel branch of the partial winding is disposed between the first and second terminals and includes a phase strand R, S, or T having a first winding direction and an uncontrolled rectifier diode 16 disposed between the phase strand and the first terminal. The second parallel branch of the partial winding 1, 2, 3 includes phase strands S and T, R and T, or R and S, each having a winding direction opposite that of the first winding direction. The second parallel branch II of each of the partial winding 1, 2, and 3 also includes an uncontrolled rectifier diode 16 disposed between the phase strands and the first terminal. This embodiment provides a lower intermediate circuit voltage than the embodiment described referring to FIG. 1. Therefore, the voltage stress to the transistors 4, 5, and 6 is considerably more favorable. When a three phase motor is used, the intermediate circuit voltage of this embodiment is one third less than that of the embodiment shown in FIG. 1.

The motor according to the present invention operates as follows. The transistors 4 to 6 are switched on one after the other, in terms of time, by the pulse width modulator 14, so that voltage is consecutively applied to the corresponding phase connections R, S and T (see FIG. 1) or the phase strands R, S, T (see FIG. 2) of the partial windings 1 to 3. This results in a rotary field which drives the rotor of the motor (not shown). The rotor can be equipped with permanent magnets, so that the motor works as a collector-free direct current motor or as a synchronous motor. An asynchronous motor may be obtained by providing a squirrel cage rotor. The speed of the motor can be changed by adjusting the frequency of the control impulses given off by the pulse width modulator 14. As the frequency of the control impulses increases, so does the speed of the motor.

Due to the galvanic separation of the partial windings 1 to 3 and since only one phase connection R or S or T, respectively, of the partial winding 1 to 3 in question is switched on in each case, the short-circuit connections between the positive and the negative pole of the direct current intermediate circuit 7 which would require a second controllable semiconductor element are not necessary. Therefore, only one controllable semiconductor element is required for each phase.

Forming the partial windings 1 to 3 requires practically no additional expenditure if the winding coils of the stator winding are formed with a number of parallel conductors corresponding to the number of partial windings 1 to 3. The parallel conductors of the winding coils are housed in the same stator grooves in each case.

Harmful back-currents or cross-currents are prevented by the rectifier diodes 16 which connect the uncontrolled phase connections of the partial windings 1 to 3 with the corresponding pole of the direct current intermediate circuit 7.

What is claimed is:

1. A converter powered n-phase motor system including:
    a) means for providing a direct current, said means for providing a direct current having a first pole and a second pole;
    b) a plurality of n partial windings,
       i) arranged in equal grooves,
       ii) each of said plurality of n partial windings corresponding to
       a particular one of the phases of said n-phase motor, and
       iii) each of said plurality of n partial windings including a plurality of n phase connections, each of said plurality of n phase connections corresponding to a particular one of the phases of said n-phase motor;
    c) a plurality of n controllable semiconductor switching elements, each of said plurality of n controllable semiconductor switching elements being disposed between said first pole of said means for providing a direct current and a different one of said plurality of n phase connections; and
    d) means for providing control signals to each of said plurality of n controllable semiconductor switching elements such that said plurality of n controllable semiconductor switching elements couples one phase connection, corresponding to said particular one of the phases of said n-phase motor to which its partial winding corresponds, to said first pole of said means for providing a direct current, wherein other phase connections, not corresponding to said particular one of the phases of said n-phase motor to which its partial winding corresponds, are connected to said second pole of said means for providing a direct current.

2. The converter controlled n-phase motor system as claimed in claim 1 further comprising:
    e) a plurality of uncontrolled rectifier elements wherein for each phase connection, an uncontrolled rectifier element is electrically connected between said other phase connections and said second pole of said means for providing a direct current.

3. The converter powered n-phase motor system as claimed in claim 1 wherein said means for providing a control signal has a control frequency.

4. The converter powered n-phase motor system as claimed in claim 3 wherein said control frequency of said means for providing a control signal is adjustable.

5. The converter powered n-phase motor system as claimed in claim 1 wherein the motor is structured as an asynchronous motor with a squirrel cage rotor.

6. The converter powered n-phase motor system as claimed in claim 2 wherein the motor is structured as an asynchronous motor with a squirrel cage rotor.

7. The converter powered n-phase motor system as claimed in claim 3 wherein the motor is structured as an asynchronous motor with a squirrel cage motor.

8. The converter powered n-phase motor system as claimed in claim 4 wherein the motor is structured as an asynchronous motor with a squirrel cage rotor.

9. The converter powered n-phase motor system as claimed in claim 1 wherein said plurality of n partial windings are formed by conductors wound in parallel.

10. The converter powered n-phase motor system as claimed in claim 2 wherein said plurality of n partial windings are formed by conductors wound in parallel.

11. The converter powered n-phase motor system as claimed in claim 3 wherein said plurality of n partial windings are formed by conductors wound in parallel.

12. The converter powered n-phase motor system as claimed in claim 4 wherein said plurality of n partial windings are formed by conductors wound in parallel.

13. A converter powered n-phase motor system comprising:
a) means for providing a direct current, said means for providing a direct current having a first pole and a second pole;
b) a plurality of n partial windings,
  i) arranged in equal grooves,
  ii) each of said plurality of n partial windings corresponding to a particular one of the phases of said n-phase motor, and
  iii) each of said plurality of n partial windings including
    A) a plurality of n phase strands, each of said plurality of n phase strands corresponding to a particular one of the phases of said n-phase motor,
    B) a first terminal connected to said first pole of said means for providing a direct current,
    C) a second terminal,
    D) a first parallel branch
      1) being disposed between said first terminal and said second terminal,
      2) including one phase strand, said one phase strand corresponding to said particular one of the phases of said n-phase motor to which its partial winding corresponds, and said one phase strand having a first winding direction, and
      3) including an uncontrolled rectifier diode disposed between said one phase strand and said first terminal, and
    E) a second parallel branch
      1) being disposed between said first terminal and said second terminal,
      2) including other phase strands, said other phase strands not corresponding to said particular one of the n phases of said n-phase motor to which its partial winding corresponds, and said other phase strands having a winding direction opposite that of said first winding direction, and
      3) including an uncontrolled rectifier diode disposed between said other phase strands and said first terminal;
c) a plurality of n controllable semiconductor switching elements, each of said controllable semiconductor switching elements being disposed between said second pole of said means for providing a direct current and said second terminal of a different one of said plurality n of phase connections; and
d) means for providing a control signals to each of said plurality of n controllable semiconductor switching elements such that they conduct in a particular sequence.

14. The converter powered n-phase motor system as claimed in claim 13 further comprising a plurality of n uncontrolled rectifier diodes disposed between said second terminal of each of said plurality of n partial windings and said second pole of said means for providing a direct current.

15. The converter powered n-phase motor system as claimed in claim 13 wherein said means for providing a control signal has a control frequency.

16. The converter powered n-phase motor system as claimed in claim 15 wherein said control frequency of said means for providing a control signal is adjustable.

17. The converter powered n-phase motor system as claimed in claim 13 wherein the motor is structured as an asynchronous motor with a squirrel cage rotor.

18. The converter powered n-phase motor system as claimed in claim 14 wherein the motor is structured as an asynchronous motor with a squirrel cage rotor.

19. The converter powered n-phase motor system as claimed in claim 15 wherein the motor is structured as an asynchronous motor with a squirrel cage rotor.

20. The converter powered n-phase motor system as claimed in claim 16 wherein the motor is structured as an asynchronous motor with a squirrel cage rotor.

* * * * *